United States Patent [19]

Valencia

[11] Patent Number: 4,677,957
[45] Date of Patent: Jul. 7, 1987

[54] CONTROL SYSTEM FOR INTERNAL COMBUSTION ENGINES

[75] Inventor: Alvaro G. Valencia, Quindio, Colombia

[73] Assignee: Turbo's Investigacion Energetica, Colombia

[21] Appl. No.: 825,906

[22] Filed: Feb. 4, 1986

[51] Int. Cl.$^4$ ............................................. F02M 25/06
[52] U.S. Cl. ..................................... 123/572; 123/574
[58] Field of Search ................ 123/572, 573, 574, 585

[56] References Cited

U.S. PATENT DOCUMENTS

| | | | |
|---|---|---|---|
| 3,326,198 | 6/1967 | Jackson | 123/572 |
| 3,923,024 | 12/1975 | Dabrio | 123/574 |
| 4,210,113 | 7/1980 | Heffernan | 123/574 |
| 4,270,508 | 6/1981 | Lindberg | 123/572 |

*Primary Examiner*—Ronald B. Cox
*Attorney, Agent, or Firm*—Mark C. Jacobs

[57] ABSTRACT

A control system for internal combustion engines adapted to take in ambient air and mix it with waste gases from a crankcase to form a molecular comburent mixture to aid in combustion. The system includes a housing mounted between the crankcase and the engine manifold that both forms the comburent mixture and regulates the introduction of the same into the engine manifold.

10 Claims, 6 Drawing Figures

CONTROL SYSTEM FOR INTERNAL COMBUSTION ENGINES

BACKGROUND OF THE INVENTION

1. Field of the Invention

The invention relates to internal combustion engines; and, more particularly, to a molecular comburent control system for such engines.

2. Description of the Prior Art

The scarcity of fuel and the rising costs of fuel that is available has resulted in efforts to provide automobiles that have better fuel economy. In U.S. Pat. No. 3,809,035 to Winton, an air admission valve is disclosed which supplies a combination of ambient air and waste gases, produced in the crankcase, which is then sent to the manifold and subsequently admitted into the combustion chamber. This system, however, does not utilize all of the gases produced as a direct effect of friction and heat acting on the oil in the engine during the lubrication process. The Winton system merely adds ambient air to the waste gases from the crankcase and supplied this mixture to the manifold under limited control. Such a system is not efficient and also allows the escape of a certain amount of waste gases into the atmosphere causing pollution. In addition, the ball 72 does not seal completely in the downstroke position thus allowing escape of undesirable gases. - See patent.

There is thus a need for a control system for an internal combustion engine which efficiently controls the air injected into the combustion chamber resulting in saving of fuel and prevention of the escape of waste gases into the atmosphere.

SUMMARY OF THE INVENTION

It is an object of this invention to provide a system for combining ambient air with waste gases from a crankcase prior to induction of the same into the combustion chamber of a vehicle.

It is a further object of this invention to carry out the foregoing object in a manner regulating the ambient air according to engine demand.

It is still further an object of this invention to carry out the foregoing objects without need for additional or external compressors while preventing escape of waste gases into the atmosphere.

These and other objects are preferably accomplished by providing a housing which is adapted to be mounted between the crankcase and the manifold of an internal combustion engine. The housing has a valve controlled ambient air inlet leading into a mixing chamber. A waste gas inlet leads into the mixing chamber and a molecular comburent mixture outlet leads out of the mixing chamber. A turbine in the mixing chamber mixes the incoming waste gases with the incoming ambient air to form the molecular comburent mixture.

DESCRIPTION OF THE PREFERRED EMBODIMENT

Figure 1:
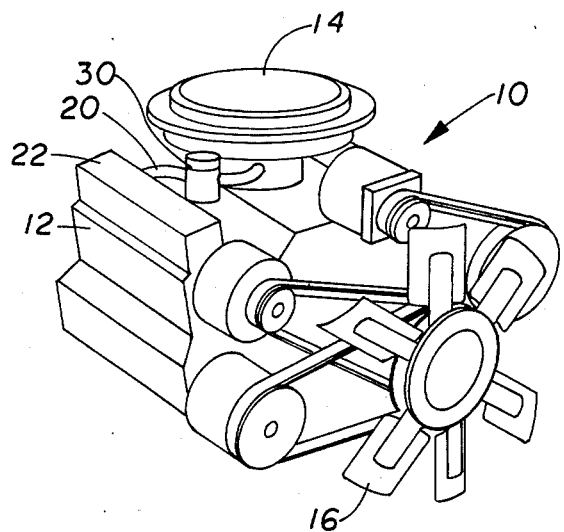
FIG. 1 is a perspective view of a conventional internal combustion engine having the control system of the invention mounted thereon.

Referring now to FIG. 1 of the drawing, a conventional internal combustion engine 10 of the V-type is shown having two banks of cylinders 12. Of course, engine 10 is exemplary and any suitable internal combustion engine may be used.

The engine 10 includes a carburetor and an air intake filter within a housing designated at 14. The engine 10 includes a fan 16 and a conventional generator, fuel and lubricating pumps, etc., all as is well known in the art. As seen in FIG. 1, engine 10 includes a conduit 20 connected between the engine crankcase and the intake manifold for returning crankcase gases back into the engine 10. The conduit 20 may be connected to the rocker arm cover 22, at one end, and to the intake manifold of engine 10 at the other end.

Figure 2:
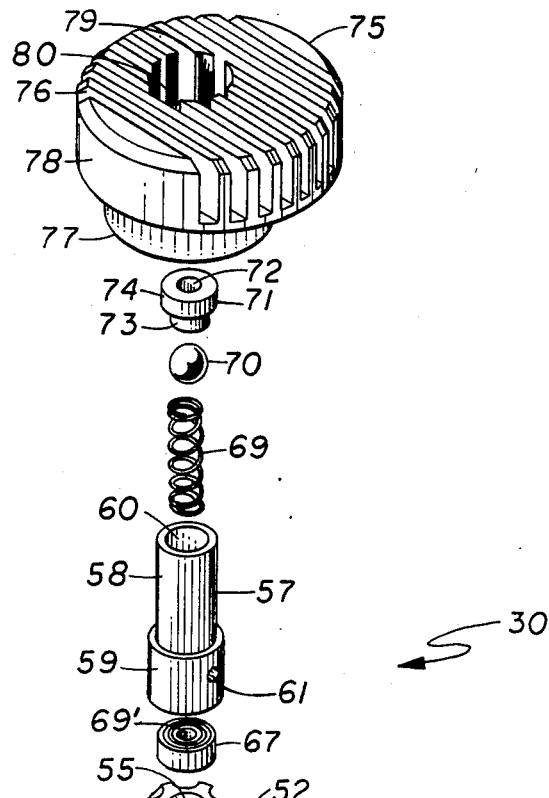
FIG. 2 is a perspective view of the control system alone in FIG. 1.
Figure 2:
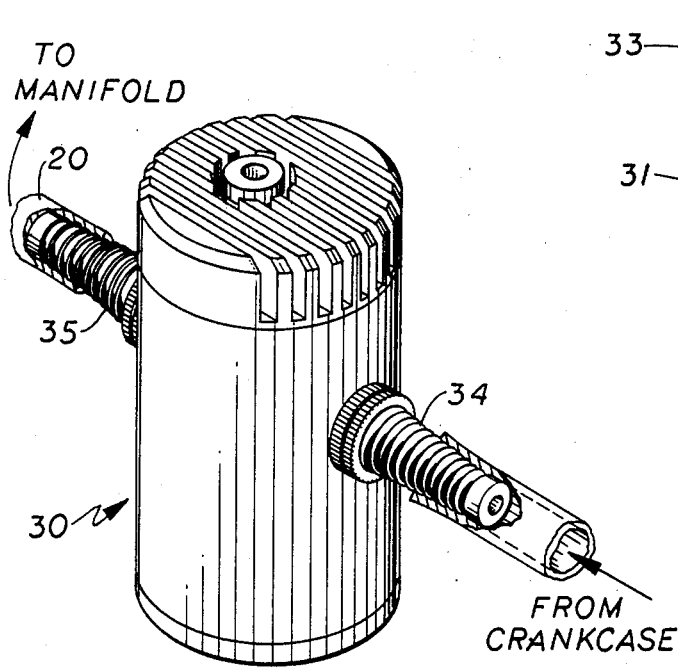
Figure 3:
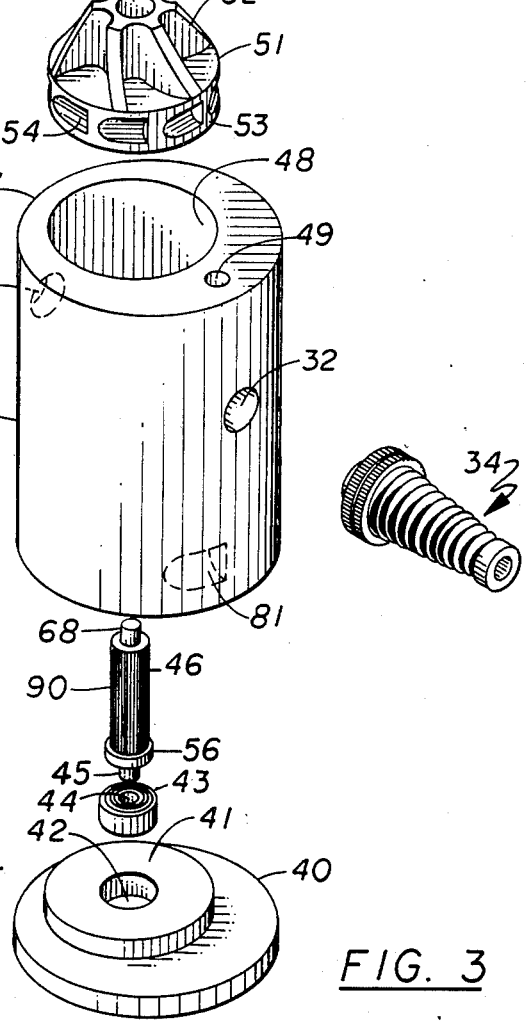
FIG. 3 is an exploded view of the valve system of FIG. 2.
Figure 4:
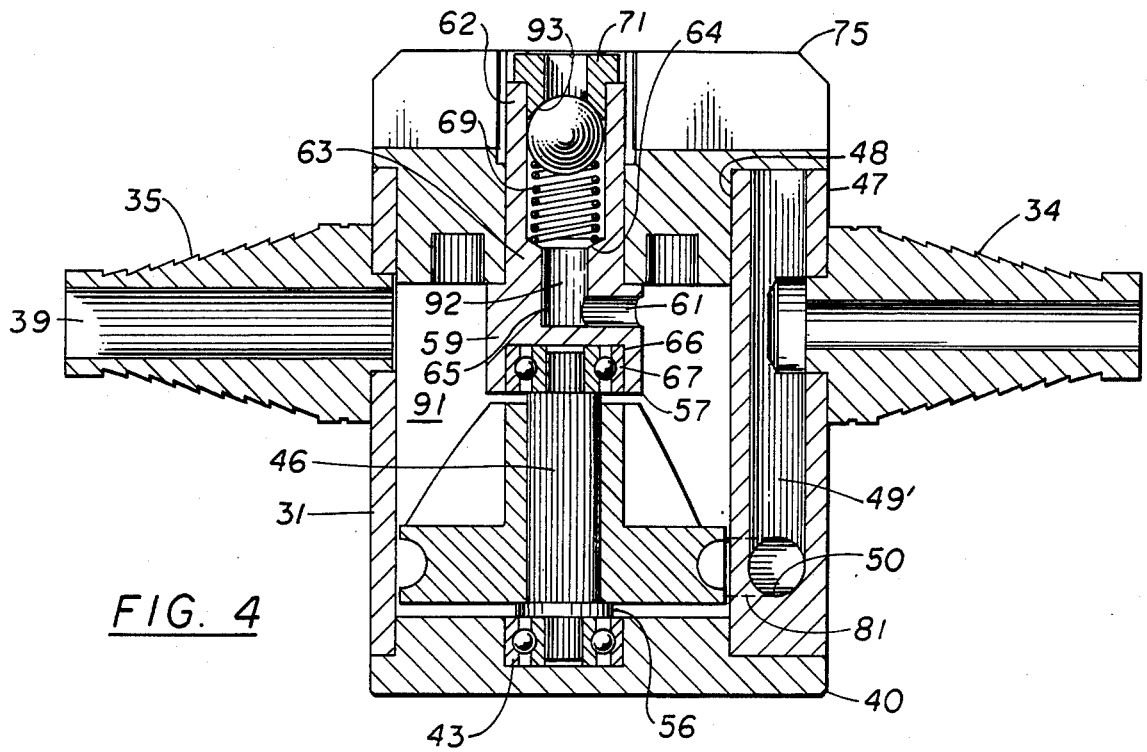
FIG. 4 is a vertical cross-sectional view of the assembled control system of FIG. 3.

As particularly contemplated in the present invention, an improved control system 30 is mounted in conduit 20. As seen in FIG. 2, systm 30 is merely coupled in the line 20. As seen in FIG. 3, control system 30 includes a main body 31, generally cylindrical, and open at both ends. The thickness of the wall thereof varies as seen in FIG. 3 which is formed as a result of the central axis of the throughbore 48 being offset from the central axis of the body 31, as will be discussed. Body 31 includes openings 32,33 on each side thereof adapted to receive therein nipples 34,35, respectively. As seen in FIG. 2, nipple 34 is coupled to the waste gas side of conduit 20 and nipple 35 is coupled to the manifold side of the conduit 20. Each nipple 34,35 includes a knurled body portion 36, for turning the same, and a ribbed tapered body portion 37 for pressure fit and gripping of the interior surfaces of conduit 20. Each nipple 34,35 also includes a boss 38 prefit for entry into openings 32,33, respectively (see FIG. 4). As also seen in FIG. 4, each nipple 34,35 has a throughbore 39 for passing of fluid therethrough from and to the interior of body 31, respectively.

A cap 40, per FIG. 3, is provided having a circular boss 41 surrounding a cavity 42. As seen in FIGS. 3 and 4, boss 41 is offset on cap 40 to coincide with the offset throughbore in 31. A roller bearing 43 is mounted in cavity 42 (FIG. 4) in close fitting relationship and receives in the center 44 thereof, when cap 40 is assembled to body 31 as seen in FIG. 4, the lower end 45 of a shaft 46. Looking at FIG. 4, it can be seen that body 31 has an outer cylindrical wall 47 with an inner wall 48 (or throughbore) a hole 49 and bore 49' (FIG. 6) extending down therethrough and communicating with hole 32. Bore 49' is closed off at the bottom by a bottom wall 50 and opens to an elongated duct 81 (dotted lines in FIGS. 6 and 4) leading to opening 103, see infra. per FIG. 3, the inner wall 48 communicates into the outer wall 47 thus forming a cylinder with an offset throughbore, as seen in FIG. 3, with hole 49 in the wider portion thereof. Boss 41 is thus offset to accomodate for this and, as seen in FIG. 4, press fits into the bottom of body 31 with impeller 46 having its end 45 mounted in bearing 43 as shown.

A turbine 51 is provided (FIG. 3) having a plurality of spaced curved turbine blades 52 mounted thereon. Turbine 51 has a circular base 53 with a plurality of spaced slots 54 about the periphery thereof. Turbine 51 is generally conically shaped with a central axial aperture 55. As seen in FIG. 4, when assembled to body 31, turbine 51 is disposed above cap 40 with impeller 46 entering the aperture 55 therein. Impeller 46 has an enlarged diameter body portion 56 which abuts against the bottom of turbine 51 (FIG. 4) and spaces turbine 51 from the upper surface of cap 40. Impeller 46, pivots on bearings 43 and 67 to rotate turbine 51.

An air intake valve body member 57 is provided (FIG. 3) having a first generally cylindrical body portion 58 of one diameter and a second generally cylindrical body portion 59 of greater diameter than body portion 58. A throughbore 60 extends axially through body member 57 and an air delivery vent or port 61 communicates the interior of throughbore 60 with the exterior thereof. As seen in FIG. 4, the body portion 58 includes an upper thin walled section 62 and a lower thick walled section 63 forming a shoulder 64. The lower body portion 59 has an inner wall 65 closing off the bottom of throughbore 60 and a cavity 66 receiving therein a second roller bearing 67 (see also FIG. 3). Impeller 46 includes a shaft 68 at its upper end (FIG. 3) receivable in the central opening 69' in bearing 67.

Figure 5:
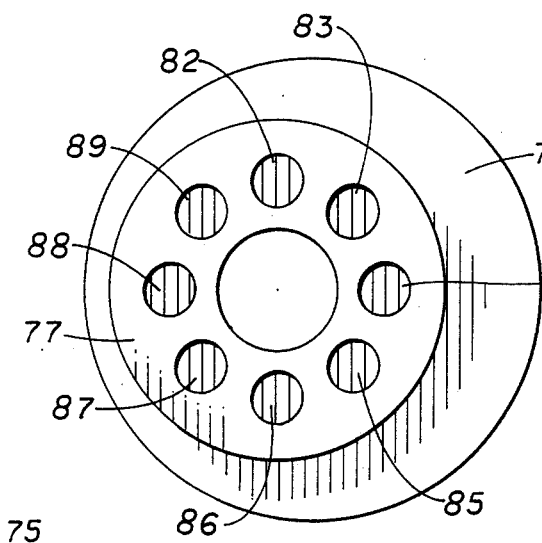
FIG. 5 is a bottom plan view of one of the elements of the control system.

A coiled spring 69 is disposed within throughbore 60 abutting against shoulder 64. A ball 70 is disposed in the top of spring 69 and an air intake cap 71, having a throughbore or air intake port 72, is mounted in the top of throughbore 60 closing it off (FIG. 4), as by press fitting, the cap 71 having a lower body 73 of a smaller diameter than the upper body 74 thereof (FIG. 3). Finally, a thermal protection cap 75, having a plurality of slotted ribs 76, with a lower body portion 77 of a reduced diameter eccentric to the diameter of the upper body portion 78 having the ribs 76 thereon, press fits into 48, the throughbore in the open upper end of body 31, as seen in FIG. 4. The spaces between ribs 76 thus form cooling channels. A cavity 79 is provided in the body portion 78, offset from the central axis thereof, surrounding an opening 89, communicating the throughbore 60 (FIG. 4). A plurality of cooling perforations or holes, such as eight holes, equally spaced, 82 through 89 (FIG. 5) are provided in the bottom of cap 75.

Shaft 46 may be fluted, as at flutes 90, along the body thereof as shown in FIG. 3. A mixing chamber 91 is thus formed internally of system 30 with an air reserve chamber 92 formed below spring 69 internally of valve body member portion 59. Blades or vanes 52 are mixing vanes and may be of any suitable curvature. Cap 71 is chamfered at 93 to form a seat for ball 70.

In operation, waste gases from the crankcase flow through inlet 34 under suction due to the stroke of the engine. These gases flow down port 49 and through port 81 into the interior 109 of body 31 through opening 103 against impelling grooves 54. The pressure of these gases against impelling grooves 54 results in continuous and sustained rotation of mixing turbine 51.

Ambient air is sucked into air intake port 72 against the bias of ball 70 and into chamber 92. The ball 70, and chamfer 93, prevent the escape of waste gases into the atmosphere out of port 72. The ambient air in chamber 92 flows into mixing chamber 91 through air delivery vent 61 where it admixes with the waste gases. Thermal protection cap 75 seals the upper part of the assembly and holds the upper part of the air intake valve mixing turbine assembly by means of a tight fit with member 57. Member 57 may be provided with insulation at its upper end surface for additional cooling.

This results in a molecular comburent mixture which then exits from the mixing chamber 91 out of opening 39 to the combustion chamber of the vehicle. Thus, the combined inflow of ambient air and waste gases entering chamber 91 via vent 61 communicating with chamber 92 and port 81 are carefully regulated by the preselected different duct and vent diameters to match the admixture outflow capability provided by duct 39.

Figure 6:
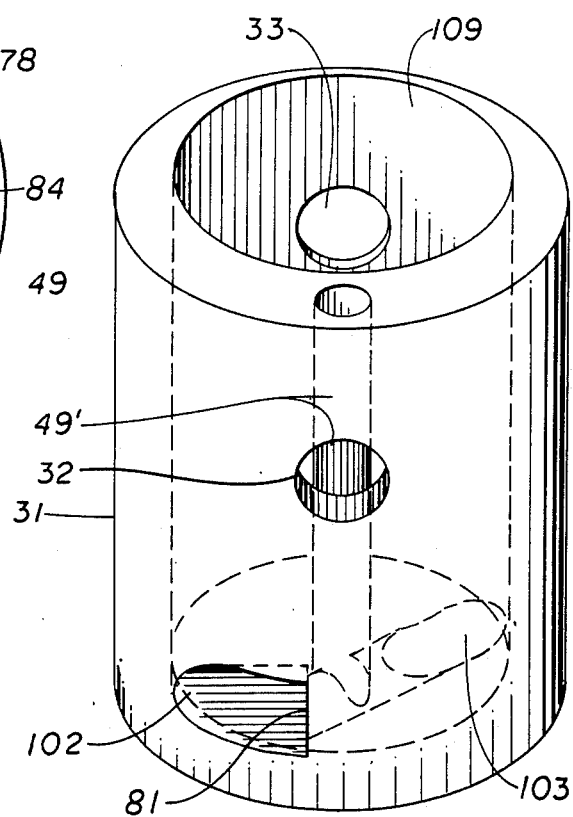
FIG. 6 is a perspective view of a portion of the invention.

The inlet control system 30 thus forms a molecular comburent mixture that aids in combustion. The system thus acts as a crankcase gas-air mixing valve and saves fuel. FIG. 6 is a perspective view of the main body 31. Port entry 102 is seen to communicate with the port bore 81, which is drilled tangentially along the body wall as shown in dotted line. Since the port bore is straight and the body wall curved, after a finite distance of about ¼" the port bore will enter into the interior of the body and form an opening therein designated 103. The incoming gases are thus able to enter through 32, go down bore 49', i.e. the continuation of hole 49, and enter into the interior 109 of the body at 103, whereby the incoming gases can impact upon slots 54 to rotate turbine 51.

Port 81, which is seen to have been drilled only to form opening 103 in communication with vertical bore 49', is filled in, as is port entry 102, to form a smooth walled body. It is for this reason that port 81 is shown in dotted line in FIG. 3.

Hole 49, which is used only to create bore 49' is also closed off by any conventional technique, such as by sealing a ball bearing in place, since only the section of 49' below hole 32 at a right angle thereto is needed. It will operate on all internal combustion engines burning either alcohol or gasoline. The spring biased ball 70 prevents the escape of waste gases into the atmosphere. The action of heat and high speed rotation of turbine 51 results in greater explosion and expansion of the admixed gases thus acting as a turbocharger. This turbine 51 speeds up the reaction between the incoming ambient air and the incoming waste gases rendering the hydrocarbon gases useable as fuel. Complete and efficient control of the volatility and expansion of the gases is obtained. A high calorific mixture, i.e., a molecular comburent mixture, is obtained. The suction power of the engine stroke is used to generate continuous rotation of turbine 51 with the ambient air inlet operating in direct relation to engine acceleration. This results in a fast mix of gases generating the desired chemical reaction.

Any suitable materials may be used, such as aluminum. Any suitable dimensions and seals may also be used. For example, the various openings and ducts may be sized to cooperate with the manifold to produce the desired mixture. For example, the diameter of the exit port 39 is dependent on the number of cylinders in the vehicle.

Preferred dimensions may be about 38 mm. in diameter for the cap 75 and valve body 31 with opening 48 being about 28 mm. in diameter. Opening 32 may be about 8 mm. in diameter and about 27 mm. up from the bottom with body 31 being about 40 mm. long. The opening of throughbore 60 may be about 6.5 mm. in diameter with the lower bore being about 4 mm. in diameter, hole 61 being about 2.5 mm. in diameter. Opening 33 may be about 8 mm. in diameter. Nipples 34,35 may be about 27.4 mm. long and opening 48 may be offset about 3 mm. from the central axis of body 31. These dimensions are of course only exemplary and are selected to provide sufficient input of ambient air and mixture of waste gases, and outflow of the molecular comburent mixture upon successive strokes of the particular engine in which the system is installed. Typically nipples 34,35 have 4 mm and 6 mm internal diameters respectively.

Dimensions also vary with the size of the engine and the number of cylinders of the engine.

While not prevsiouly discussed in detail, it is to be seen that the conduit 20 referred to previously which is present in most internal combustion automobile engines also collects gases from under the rocker arm cover.

When lengthy tests of the device of this invention were run in Columbia, South America on an 8 cylinder engine 1971 Dodge; an 8 cylinder engine 1981 Chevrolet; and on a 4 cylinder 1976 Simca, and with no other modifications to the engines other than the inline installation of this device, significant improvements in the miles per gallon of gasoline were obtained for all three tested vehicles compared to the operation of these same vehicles under similar conditions without the device of this invention.

Since certain changes may be made in the above apparatus without departing from the scope of the invention herein involved, it is intended that all matter contained in the above description and shown in the accompanying drawing shall be interpreted as illustrative and not in a limiting sense.

I claim:

1. In a control system for use in internal combustion engines, having a crankcase and having an intake manifold, comprising:
   a main body having a throughbore therein offset from the central axis thereof;
   an inlet leading into the interior of said throughbore, said inlet being connected to the crankcase;
   an outlet in fluid communication with the interior of said throughbore, said outlet being connected to the intake manifold;
   a shaft mounted for rotation in said bore;
   a turbine having a plurality of blades thereon keyed to said shaft for rotation therewith, said turbine having turbine rotating means disposed in a position wherein fluids entering said throughbore from said inlet impel on said turbine rotating means thereby rotating said turbine; and
   spring biased ambient air valve means mounted at the top of said main body having an inlet communicating with the interior of said throughbore with a spring biased ball mounted in said inlet adapted, in a first position, to admit ambient air into the interior of said throughbore and, in a second position, prevent any fluids in said throughbore from exiting out of said inlet.

2. In the system of claim 1 wherein said inlet includes a first passageway extending normal to the central axis of said main body communicating with a second passageway offset from said central axis of said main body but parallel thereto communicating at the bottom with a third passageway opening into the interior of said throughbore.

3. In the system of claim 1 wherein said outlet includes a passageway extending normal to the central axis of said body communicating with the interior of said throughbore, the diameter of said passageway being substantially greater than the diameter of said inlet.

4. In the system of claim 1 wherein said body is closed off at the bottom by an end cap, said end cap having a boss thereon closing off the bottom of said throughbore, said impeller having a first ball bearing mounted in an opening in said boss with a knurled shaft extending upwardly therefrom having its upper end mounted in a second ball bearing, said turbine being keyed to said shaft.

5. In the system of claim 1 wherein said turbine includes a base mounted on said shaft, said turbine rotating means including a plurality of peripheral slots about the base of said turbine.

6. In the system of claim 1 wherein said body is closed off at the top by a thermal cap having a plurality of spaced elongated ribs forming air channels in the top thereof.

7. In the system of claim 6 wherein said thermal cap includes a plurality of spaced cavities on the underside thereof communicating with the interior of said throughbore.

8. In the system of claim 6 wherein said thermal cap includes an opening therethrough axially aligned with the central axis of said throughbore and in fluid communication therewith, said air valve means including an inlet housing mounted in said opening having an axial throughbore communicating at the top with the exterior of said thermal cap and at the bottom with the interior of said body throughbore, a passageway in said inlet housing at the bottom thereof extendng normal to said inlet housing axial throughbore and also communicating with the interior of said body throughbore.

9. In the system of claim 8 wherein said inlet housing includes a shoulder in the interior thereof above the intersection of said inlet housing throughbore and said passageway through said inlet housing, a resilient ball return spring mounted in said inlet housing on said shoulder, said ball being mounted on the top of said spring, said inlet housing being closed off at the top by an apertured cap providing a seat for said ball on the undersurface thereof.

10. In the system of claim 9 wherein said inlet housing has a cavity in the bottom thereof below the intersection of said inlet housing throughbore and said passageway therethrough, said body being closed off at the bottom by an end cap, said end cap having a boss thereon closing off the bottom of said throughbore, said shaft having a first ball bearing mountd in an opening in said boss with a knurled shaft extending upwardly therefrom and having its upper end mounted in a second ball bearing mounted in said cavity in said inlet housing, said turbine being mounted on said shaft and keyed for rotation therewith.

* * * * *